United States Patent
Szuba

(10) Patent No.: US 9,328,812 B2
(45) Date of Patent: May 3, 2016

(54) METHOD OF MANUFACTURING IMPELLER AND TURBINE ASSEMBLIES

(71) Applicants: SZUBA CONSULTING INC., Dearborn, MI (US); VALUE EXTRACTION LLC, Dearborn, MI (US)

(72) Inventor: Joseph A. Szuba, Dearborn, MI (US)

(73) Assignees: VALUE EXTRACTION LLC, Dearborn, MI (US); SZUBA CONSULTING, INC., Dearborn, MI (US)

( * ) Notice: Subject to any disclaimer, the term of this patent is extended or adjusted under 35 U.S.C. 154(b) by 0 days.

(21) Appl. No.: 14/769,483

(22) PCT Filed: Mar. 5, 2013

(86) PCT No.: PCT/US2013/029159
§ 371 (c)(1),
(2) Date: Aug. 21, 2015

(87) PCT Pub. No.: WO2014/007850
PCT Pub. Date: Jan. 9, 2014

(65) Prior Publication Data
US 2015/0377331 A1    Dec. 31, 2015

Related U.S. Application Data

(60) Provisional application No. 61/667,717, filed on Jul. 3, 2012.

(51) Int. Cl.
*F16H 41/28* (2006.01)
*F16H 41/24* (2006.01)
*F01D 5/02* (2006.01)
*F01D 5/30* (2006.01)
*F04D 29/18* (2006.01)
*F16H 41/04* (2006.01)

(52) U.S. Cl.
CPC *F16H 41/28* (2013.01); *F01D 5/02* (2013.01); *F01D 5/3023* (2013.01); *F04D 29/18* (2013.01); *F16H 41/04* (2013.01); *F16H 41/24* (2013.01); *F05D 2230/60* (2013.01); *Y10T 29/49321* (2015.01)

(58) Field of Classification Search
CPC ......... F16H 41/28; F16H 41/04; F16H 41/24; F01D 5/02; F01D 5/3023; F04D 29/18; F05D 2230/60; Y10T 29/49316; Y10T 29/4932; Y10T 29/49321
See application file for complete search history.

(56) References Cited

U.S. PATENT DOCUMENTS 7,958,724 B2 *   6/2011   Wiegert .................. F16H 41/28
                                                         60/364
8,042,330 B2 * 10/2011   Wiegert .................. F16H 41/28
                                                         60/364

* cited by examiner

*Primary Examiner* — Moshe Wilensky
(74) *Attorney, Agent, or Firm* — Carlson, Gaskey & Olds

(57) ABSTRACT

A method of manufacturing an impeller and turbine assembly of a transmission includes providing an impeller housing and a turbine housing. An impeller blade defining an impeller receptor and a turbine blade defining a turbine receptor are provided. The impeller blade is mated to the impeller housing by deforming a portion of said impeller housing into the impeller receptor. The turbine blade is mated to the turbine housing by deforming a portion of the turbine housing into the turbine receptor. In this manner, the impeller blade is secured to the impeller housing and the turbine blade is secured to the turbine housing.

23 Claims, 5 Drawing Sheets

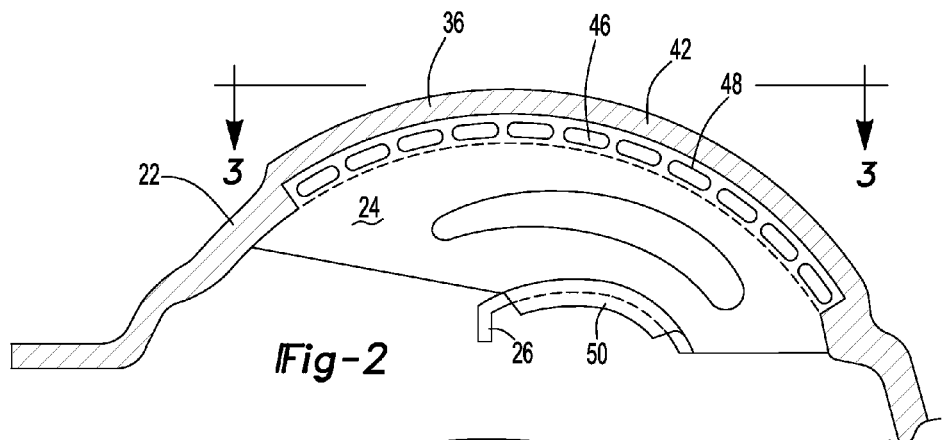
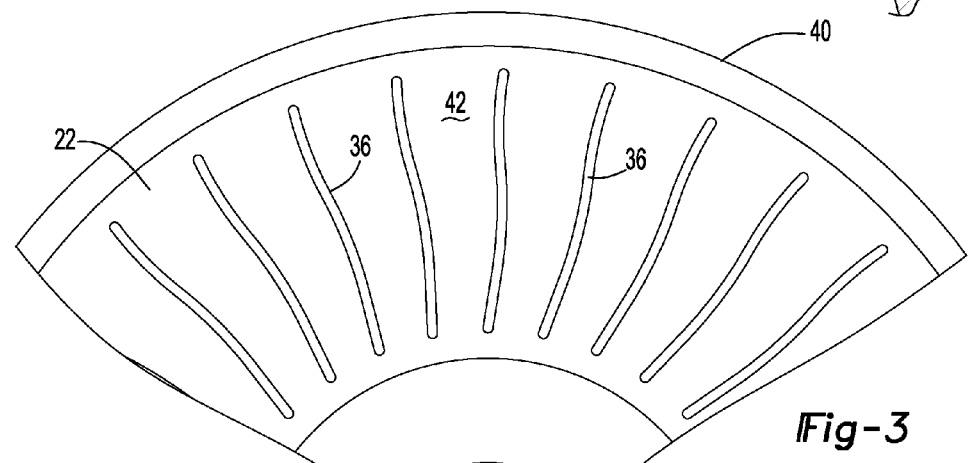
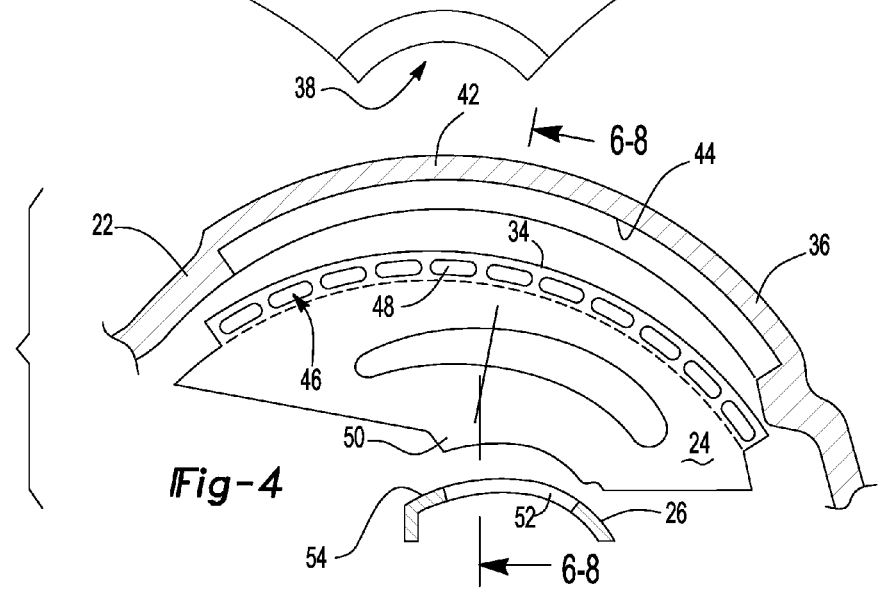

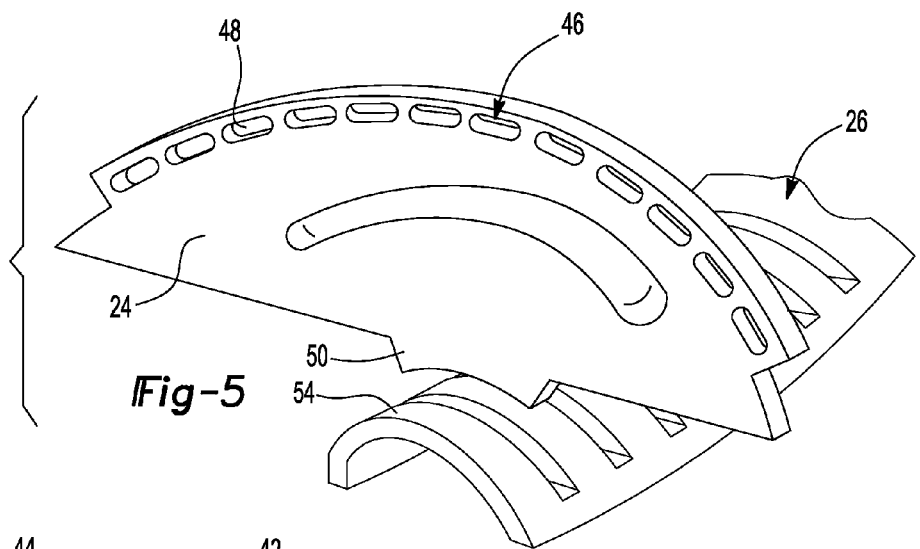
Fig-5
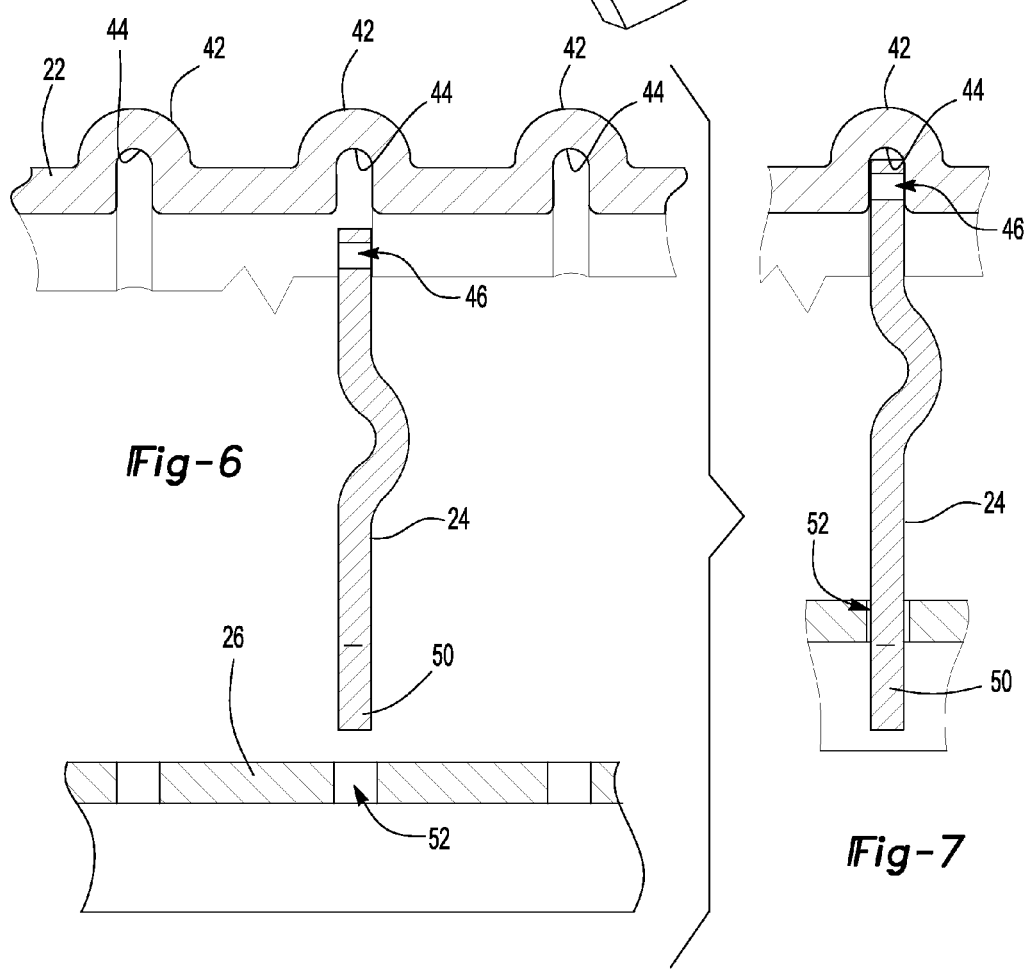
Fig-6
Fig-7

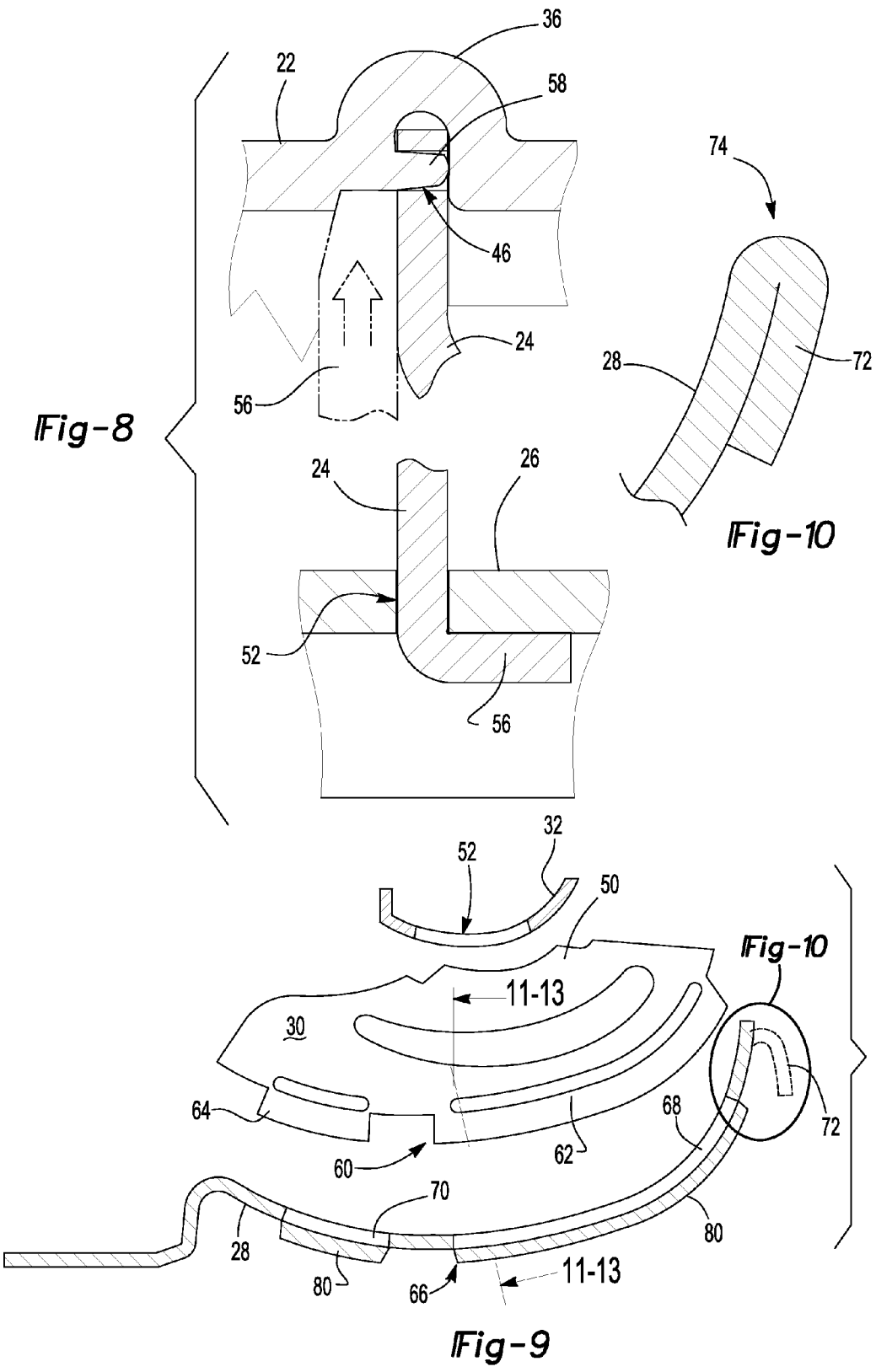

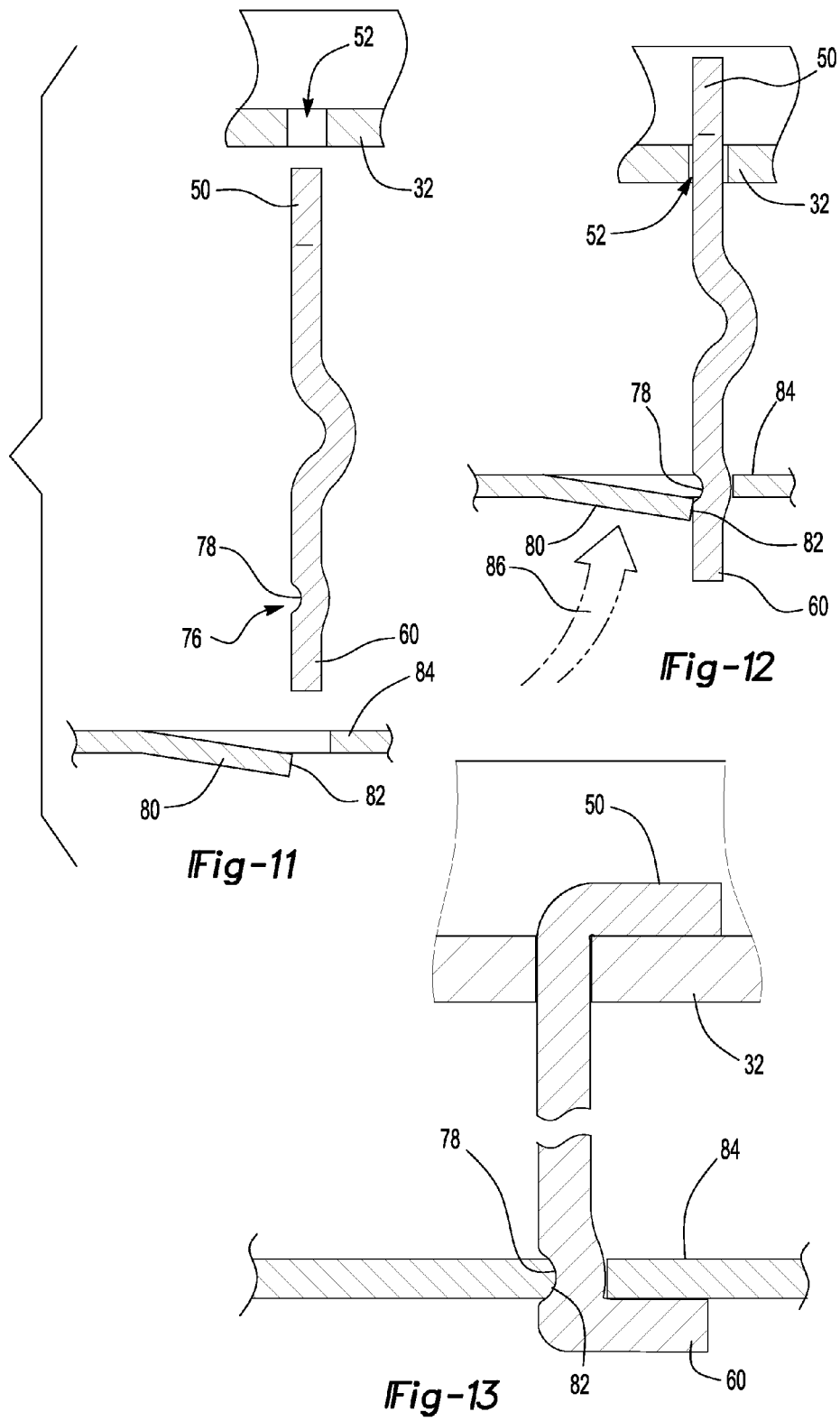

METHOD OF MANUFACTURING IMPELLER AND TURBINE ASSEMBLIES

CROSS-REFERENCE TO RELATED APPLICATIONS

The present application is the National Stage of International Patent Application No. PCT/US2013/029159, filed on Mar. 5, 2013, which claims priority to and all advantages of U.S. Provisional Patent Application No. 61/667,717 filed Jul. 3, 2012, the content of which is hereby incorporated by reference.

FIELD OF THE INVENTION

The present application relates generally to a method of manufacturing impeller and turbine assemblies. More specifically, the present application relates to forming joints between various elements of impeller and turbine assemblies without the use of brazing.

BACKGROUND

Various components of transmission assemblies such as, for example, impeller assemblies and turbine assemblies are subject to significant forces from transmission fluid flowing throughout transmission housing. The impeller assembly includes a plurality of impeller blades affixed to an impeller assembly. The blades extend radially and are circumferentially spaced around the entire housing. Adequate mechanical attachment of the impeller blades to the impeller assembly has not been achieved. Therefore, the impeller blades have been attached to the impeller assembly by way of a coating process known as brazing. Likewise, the turbine blades have also been attached to the turbine housing by brazing in a similar manner.

Brazing is achieved by applying alloys to the joints formed between the blades and the housing and raising the temperature of the assembly to the melting temperature of the alloy. Additionally, brazing is also known to cause a rough surface resulting in oil turbulence in the impeller and turbine assemblies, which adversely affects efficiency and performance. While the brazing process has generally proven acceptable to secure the blades to the housings, a number of drawbacks make it desirable to eliminate brazing by way of a more secure mechanical attachment.

For example, the alloy used to braze the joints described above cause significant environmental hazards requiring significant measures be taken to avoid a detriment to technician health and contamination to the environment at large. Furthermore, the temperatures at which the assemblies must be raised to melt the brazing material is known to significantly weaken the metallic structure of both the housing and the blades. Furthermore, the addition of brazing material to the assemblies increases the mass of these assemblies significantly, which reduces the efficiency of the transmission and the associated vehicle.

Therefore, it would be desirable to eliminate the addition of brazing material to the impeller and turbine assemblies of a transmission by way of providing a more secure mechanical attachment of these blades to their housing.

SUMMARY

A method of manufacturing an impeller and turbine housing of a transmission includes providing an impeller housing and a turbine housing. An impeller blade is provided defining an impeller receptor and a turbine blade is provided defining a turbine receptor. The impeller blade is mated to the impeller housing by deforming a portion of the impeller housing into the impeller receptor. The turbine blade is mated to the turbine housing by deforming a portion of the turbine housing into the turbine receptor. By way of deformation of the housings, the impeller blade is secured to the impeller housing and the turbine blade is secured to the turbine housing in a mechanically sound manner.

By forming a receptor into the impeller blade and the turbine blade, a deformation of the housing into the receptor provides an interlocking joint between the housing and the blades. By securely interlocking the blade and the housing, a mechanical attachment is achieved providing adequate strength to the joint between the housing and the blades to withstand the forces known to occur in a transmission.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 2 shows a partial cross-sectional view of an impeller assembly of the present invention;
FIG. 3 shows a plan view of the impeller assembly along lines 3-3 of FIG. 2;
FIG. 4 shows an exploded view of the impeller assembly of the present invention;
FIG. 5 shows an exploded view of an impeller blade and an impeller shroud of the present invention;
FIG. 6 shows a cross-sectional view of the exploded impeller assembly along lines 6-6 of FIG. 4;
FIG. 7 shows a partial cross-sectional view of the impeller blade assembled to the impeller assembly and impeller shroud prior to deformation;
FIG. 8 shows the deformation step of the impeller assembly and the impeller blade;
FIG. 9 shows an exploded view of the turbine assembly of the present invention;
FIG. 10 shows a flange of the turbine assembly;
FIG. 11 shows an exploded, cross-sectional view of the turbine assembly;
FIG. 12 shows the turbine blade assembled to the turbine assembly and turbine shroud prior to deformation;
and
FIG. 13 shows a partial cross-sectional view of the joints of the turbine assembly after deformation.

DETAILED DESCRIPTION

Figure 1:
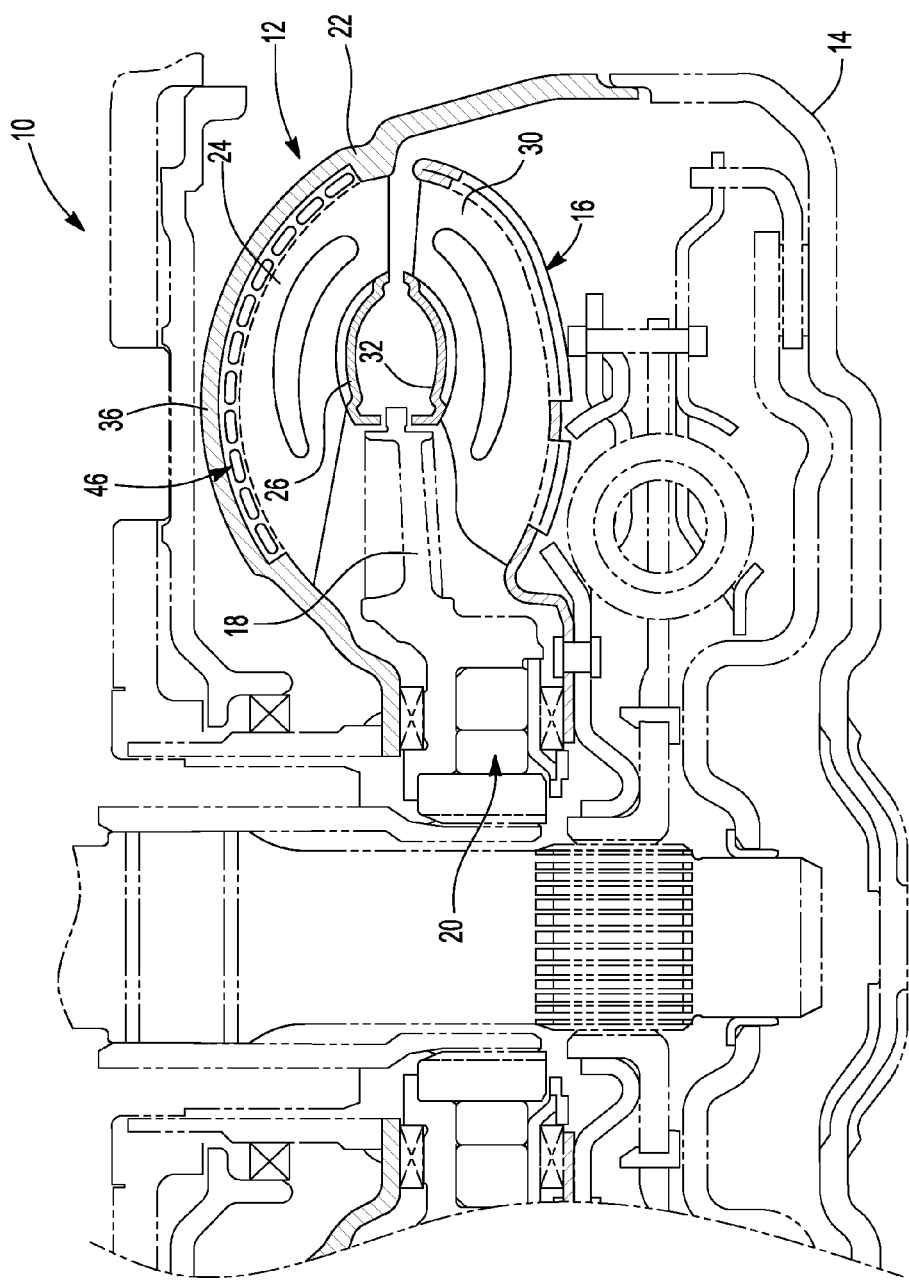
FIG. 1 shows a partial sectional view of a transmission.

Referring to FIG. 1, a partial cross-sectional view of a transmission assembly is generally shown at 10. Although this view is of an automotive transmission, it should be understood to those of ordinary skill in the art that this is just an exemplary view and that the scope of this application is beyond automotive. An impeller assembly 12 is shown fixed to a torque converter cover 14 in a known manner. A turbine assembly 16 is shown in an opposing relationship to the impeller assembly 12 as is known to those of skill in the art.

By way of establishing an environmental orientation of the impeller assembly 12 and the turbine assembly 16, a stator 18 is positioned between the impeller assembly 12 and the turbine assembly 16 in a known manner. The stator 18 is in running engagement with a one-way clutch 20 of the transmission assembly 10, also in a known manner.

The impeller assembly 12 includes an impeller housing 22 as shown here with an impeller blade 24 being mechanically attached as will be explained further herein below. The impeller blade 24 is positioned between the impeller housing 22 and an impeller shroud 26.

The turbine assembly 16 includes a turbine housing 28 as shown here with a turbine blade 30 affixedly attached. The turbine blade 30 is positioned between the turbine housing 28 and a turbine shroud 32. As set forth above, the turbine assembly 16 interacts with the impeller assembly 12 and the transmission assembly 10 in a known manner. It should be understood to those of ordinary skill in the art that the inventive feature disclosed in the present application can be used to eliminate brazing when used to affix blades to housing in any type of torque converting assembly.

As best represented in FIGS. 2-4, the impeller blade 24 defines an impeller tab 34 that mates to a impeller groove 36 defined by the impeller housing 22. As best represented in FIG. 3, a plurality of impeller grooves 36 extend radially outwardly between a central opening 38 defined by the impeller housing 22 and a distal impeller rim 40 of the impeller housing 22. As best shown in FIG. 4, the impeller housing 22 defines an arcuate wall 42 into which the impeller groove 36 is defined. The impeller groove 36 extends substantially radially outwardly along the arcuate wall 42 defined by the impeller housing 22.

The impeller tab 34 of the impeller blade 24 takes an arcuate shape and has a similar radius as the impeller groove 36 defined by the arcuate wall 42 so that a substantial portion of the impeller tab 34 contacts a base 44 of the impeller groove 36 when assembled, as best shown in FIG. 2. A receptor 46 is defined by the impeller tab 34. The receptor 46 is shown as a plurality of apertures 48 shaped as a series of spaced slots extending substantially along the impeller tab 34.

A shroud tab 50 is spaced radially inwardly of the impeller tab 34 on the impeller blade 24. The shroud tab 50 is received through a shroud slot 52 defined in an arcuate wall 54 of the impeller shroud 26. The shroud tab 50 of the impeller blade 24 includes a circumferential length that is substantially the same as the circumferential length of the shroud slot 52.

FIGS. 5-7 show the impeller blade 24 being moved into engagement with the impeller housing 22 and the impeller shroud 26. The impeller tab 34 is received into the impeller groove 36 so that a distal end of the impeller tab 34 is positioned in an abutting relationship with the groove base 44. The receptor 46 defined by the impeller tab 34 is substantially perceived into the impeller groove 34. The shroud tab 50 defined by the impeller blade 24 is received through the shroud slot 52 so that a distal end of the shroud tab 50 extends beyond the arcuate wall 54 of the impeller shroud 26 as best represented in FIG. 7.

Referring now to FIG. 8, the method by which the impeller blade 24 is fixedly attached to the impeller housing 22 and impeller shroud 26 will now be explained. A staking tool 56 deforms a portion of the impeller housing 22 adjacent the impeller groove 36 so that material from the impeller housing 22 is forced into the receptor 46 defined in the impeller tab 34 of the impeller blade 24. Therefore, the impeller housing 22 is placed in locking engagement with the impeller blade 24 securely affixing the impeller blade 24 to the impeller housing 22. Because the receptors 46 are defined as a plurality of slots 48, that portion of the impeller housing 22 appearing as a protuberance 58 enters the slots 48 in locking engagement.

Located radially inwardly from the impeller housing 22, the shroud tab 50 of the impeller blade 30 that extend through the shroud slot 52 of the impeller shroud 26 is deformed into locking engagement with the impeller shroud 26 securely affixing the impeller shroud 26 to the impeller blade 24. It is contemplated by the inventor that a rolling device or equivalent is used to deform the shroud tab 50 into locking engagement with the impeller shroud 26.

Referring now to FIG. 9, the method by which the turbine blade 30 is affixed to the turbine housing 28 and the turbine shroud 32 will now be explained. The turbine blade 30 defines a turbine tab 60 having a first member 62 and second member 64. The turbine tab 60 is received into a turbine slot 66 defined by the turbine housing 28. The first and second member 62, 64 are received by corresponding first and second apertures 68, 70 of the turbine slot 66.

A shroud tab 50 is spaced radially inwardly on the turbine blade 30 from the turbine housing 28 and mates to a shroud slot 52 defined in the turbine shroud 32 in a manner substantially the same as that explained for the impeller shroud above. Therefore, further explanation of the shroud tab 50 defined by the turbine blade 30 and its mating engagement with the turbine shroud 32 is not included.

As best represented in FIG. 10, a flange 72 is formed around a circumferential edge 74 of the turbine housing 28 to improve hoop strength of the turbine housing 28. It is contemplated by the inventors that the improved hoop strength of the turbine housing 28 may enable decreasing the thickness of the turbine housing 28 further reducing overall mass of the turbine assembly 16 beyond the elimination of brazing.

FIGS. 11-13 show the method of securely engaging the turbine blade 30 to the turbine housing 28 and the turbine shroud 32. A turbine receptor 76 is defined in the turbine blade 30 as a groove 78. The groove 78 is spaced from a distal end of the tab 60, the purpose of which will be evident further below. An offset 80 is defined in the turbine housing 28 so that an edge 82 of the turbine slot 66 is displaced from a plane defined by the turbine housing wall 84.

As best shown in FIG. 12, the tab 60 of the turbine blade 30 is inserted through the turbine slot 66 so that the receptor 76 defined by the turbine blade 30 is aligned with the plane defined by the turbine wall 84. The offset 80 is forced in the direction of arrow 86 so that the edge 82 of the turbine slot 66 is forced into the receptor 76 defined by the impeller blade 30, as best represented in FIG. 13. The tab 60 is also deformed into locking engagement with the turbine housing 28 so that the turbine blade 30 is fixedly attached to the turbine housing 28. It is believe that roll forming or cold forming the tab 60 into locking engagement with the turbine housing 28 will suffice. However, other methods of facilitating the locking engagement between the turbine blade 30 and the turbine housing 28 have also been contemplated by the inventor. It is believed that the manner in which the receptor 76 receives the offset 80 in combination with the deformation of the turbine tab 60 will create a substantially leakproof joint. In this manner, brazing is also reduced or eliminated from use with the turbine assembly 16.

It is further contemplated by the inventor that additional securement may be required in high torque applications. Therefore, it is contemplated that an adhesive such as, for example, Loctite® or an equivalent may be used to satisfy high torque requirements.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A method of manufacturing an impeller and turbine assembly of a transmission, comprising the steps of:
    providing an impeller housing and a turbine housing;
    providing an impeller blade defining an impeller receptor and a turbine blade defining a turbine receptor; and
    mating said impeller blade to impeller housing by deforming a portion of said impeller housing into said impeller receptor and mating said turbine blade to said turbine housing by deforming a portion of said turbine housing into said turbine receptor; thereby securing said impeller blade to said impeller housing and said turbine blade to said turbine housing.

2. The method set forth in claim 1, wherein said step of securing said impeller blade to said impeller housing and said turbine blade to said turbine housing is further defined by securing said impeller blade to said impeller housing and said turbine blade to said turbine housing in a brazing free manner.

3. The method set forth in claim 1, further including the step of forming a groove in said impeller housing extending radially outwardly substantially along an arcuate surface defined by said impeller housing and inserting a portion of said impeller blade defining said impeller receptor into said groove.

4. The method set forth in claim 3, wherein said step of deforming a portion of said impeller housing into said impeller receptor is further defined by deforming said housing along an edge of said groove toward said impeller blade and into said impeller receptor.

5. The method set forth in claim 1, further including the step of piercing a slot into said turbine housing and inserting a portion of said turbine blade defining said turbine receptor into said slot.

6. The method set forth in claim 5, wherein said step of piercing a slot into said turbine is further defined by deforming said turbine housing thereby moving an edge of said slot away from a surface of said turbine housing defining said slot.

7. The method set forth in claim 6, wherein said step of mating said turbine blade to said turbine housing is further defined by deforming said portion of said turbine blade inserted into said slot into locking engagement with said turbine housing.

8. The method set forth in claim 1, further including the step of providing an impeller shroud and a turbine shroud, each of said shrouds defining shroud slot extending substantially across an arcuate surface of said shrouds.

9. The method set forth in claim 8, further including the step of forming shroud tabs on said impeller blade and on said turbine blade and deforming said tabs into said shroud slots thereby securing said impeller blade to said impeller shroud and said turbine blade to said turbine shroud.

10. The method set forth in claim 1, further including the step of adhering said impeller blade to said impeller housing and said turbine blade to said turbine housing with an adhesive.

11. A method of manufacturing an impeller assembly, comprising the steps of:
    providing an impeller housing defining an arcuate wall encircling a central housing opening, with said arcuate wall having a concave side and a convex side;
    forming a plurality of circumferentially spaced, elongated grooves into said convex side of said impeller housing, with said grooves stretching radially outwardly along said arcuate wall from said central housing opening;
    providing a plurality of impeller blades, each defining a housing tab having a receptor;
    inserting said housing tab defined by each impeller blade into said groove formed into said impeller housing; and
    deforming a portion of said impeller housing adjacent said groove into said receptor defined by said impeller blade thereby securing said impeller blade to said impeller housing.

12. The method set forth in claim 11, further including the step of providing an impeller shroud defining a plurality of circumferentially spaced slots stretching radially outwardly from a central shroud opening.

13. The method set forth in claim 12, further including the step of forming shroud tabs into each of said impeller blades and inserting said shroud tab into said slot defined by said shroud.

14. The method set forth in claim 13, further including the step of deforming said shroud tab thereby securing said impeller blade to said shroud.

15. The method set forth in claim 14, further including the step of adhering each of said impeller blades to said impeller housing with adhesive.

16. The method set forth in claim 11, further including the step of forming apertures through said tab of each receptor and said apertures comprising said receptor.

17. A method of manufacturing a turbine assembly, comprising the steps of:
    providing an turbine housing defining an arcuate wall encircling a central housing opening, with said arcuate wall having a concave side and a convex side;
    piercing a slot into said arcuate wall with said slots extending radially outwardly along said arcuate wall from said central housing opening and having an edge offset from said wall;
    providing a turbine blade having a tab defining a receptor;
    inserting said tab of said turbine blade into said slot and deforming said edge into said receptor thereby securing said turbine blade to said turbine housing.

18. The method set forth in claim 17, further including the step of deforming said tab of said turbine blade into locking engagement with said turbine housing.

19. The method set forth in claim 17, wherein said step of deforming said edge of slot into said receptor is further defined by deforming said edge from an offset position into an alignment with said arcuate wall of said turbine housing.

20. The method set forth in claim 17, further including the step of forming a flange around a distal edge of said turbine housing thereby increasing hoop strength of said distal edge.

21. The method set forth in claim 17, providing an impeller shroud defining a plurality of circumferentially spaced slots stretching radially outwardly from a central shroud opening, forming shroud tabs into each of said turbine blades and inserting said shroud tab into said slot defined by said shroud.

22. The method set forth in claim 21, further including the step of deforming said shroud tab thereby securing said turbine blade to said shroud.

23. The method set forth in claim 14, further including the step of adhering each of said turbine blades to said turbine housing with adhesive.

* * * * *